United States Patent [19]

Arai et al.

[11] 4,302,571

[45] Nov. 24, 1981

[54] ROOM TEMPERATURE-CURABLE POLYOXYALKYLENE POLYETHER COMPOSITIONS

[75] Inventors: Masatoshi Arai; Koji Futatsumori, both of Annaka, Japan

[73] Assignee: Shin-Etsu Chemical Co., Ltd., Tokyo, Japan

[21] Appl. No.: 127,074

[22] Filed: Mar. 4, 1980

[30] Foreign Application Priority Data

Mar. 16, 1979 [JP] Japan .................................. 54-30618

[51] Int. Cl.$^3$ ....................... C08G 77/16; C08L 83/12
[52] U.S. Cl. ..................................... 528/32; 525/477; 525/404; 525/409; 528/34; 528/35
[58] Field of Search .................... 525/477; 528/32, 35, 528/34

[56] References Cited

U.S. PATENT DOCUMENTS 3,655,598  4/1972  Antonen et al. ..................... 525/477
3,776,977  12/1973  Chadha ............................. 525/477
3,950,588  4/1976  McDougal ........................... 528/35

FOREIGN PATENT DOCUMENTS 2827293  1/1979  Fed. Rep. of Germany ...... 525/477

*Primary Examiner*—Wilbert J. Briggs, Sr.
*Attorney, Agent, or Firm*—Toren, McGeady & Stanger

[57] ABSTRACT

A novel room temperature-curable composition is provided by the invention, of which the base polymer is a polyoxyalkylene polyether terminated at both chain ends with silanolic hydroxy groups. The composition comprises 100 parts by weight of the above silanol-terminated polyoxyalkylene polyether and 1 to 30 parts by weight of an organosilane or organopolysiloxane having, in a molecule, at least two hydrolyzable groups bonded to the silicon atoms which serves as a crosslinking agent. The composition can be stored for a long period of time when kept with exclusion of atmospheric moisture and, when exposed to the atmosphere, is rapidly cured into a rubbery elastomer having good mechanical properties. Tack-free drying of the composition is accelerated when an alkenyloxy-containing silane is used as the above-mentioned silane having hydrolyzable groups in combination with a guanidyl-containing organosilicon compound.

15 Claims, No Drawings

ROOM TEMPERATURE-CURABLE POLYOXYALKYLENE POLYETHER COMPOSITIONS

BACKGROUND OF THE INVENTION

The present invention relates to a room temperature-curable polyoxyalkylene polyether composition or, more particularly, to a polyoxyalkylene polyether composition curable at room temperature into a rubbery elastomer in the presence of moisture.

In the prior art, there are known curable compositions of which the base component is a polyoxyalkylene polyether having hydrolyzable groups, e.g. alkoxy, acyloxy, ketoximato and amino groups, at both chain ends introduced by modifying with organosilyl groups with the hydrolyzable groups bonded thereto (see, for example, Japanese Patent Disclosure No. 52-73998). These polyoxyalkylene polyethers are stable when kept in a neutral and anhydrous condition but, due to the presence of the hydrolyzable groups at the chain ends, they are defective in their instability that they are subject to the hydrolysis condensation reaction in the presence of moisture so that they must be handled in a dry condition and that their viscosity or consistency is readily increased leading to eventual gelation when kept in contact with a filler with basicity or acidity acting as a catalyst so that the formulation of a room temperature-curable composition on the base thereof is limited. In addition, a sufficiently high curing velocity of such a composition is obtained only by the addition of a considerable amount of a tin- or titanium-containing curing accelerator with consequent decrease not only in the heat resistance but also in the weathering resistance of the cured product thereof to a great extent.

Turning now to the discussion of the curing mechanism of such curable compositions, they are classified by the nature of the condensation reaction resulting in the formation of crosslinks. For example, the condensation product produced by the reaction may be a carboxylic acid, an amine, an oxime or an alcohol. The condensation reaction which proceeds with formation of a carboxylic acid, amine or oxime is disadvantageous because the carboxylic acid, amine and oxime are mostly a gaseous product with unpleasant odor having toxicity or corrosiveness so that compositions of such kinds can be used only under sufficiently strong ventilation and, when they are applied to a metal surface, treatment of the metal surface in advance with a primer is indispensable.

On the other hand, a curable composition in which the cross-links are formed by the dealcoholation condensation is almost free from the problems of toxicity and corrosiveness whereas such a composition is defective in the relatively low storage stability and rather low curing velocity at room temperature taking an undesirably long time for complete curing as well as in the poor mechanical properties of the cured products thereof such as fragility.

SUMMARY OF THE INVENTION

It is therefore an object of the present invention to provide a novel and improved room temperature-curable composition with a polyoxyalkylene polyether as the main component free from the above described problems in the prior art compositions.

The room temperature-curable polyoxyalkylene polyether composition of the present invention comprises (a) 100 parts by weight of a polyoxyalkylene polyether end-blocked with organosilyl groups and represented by the general formula

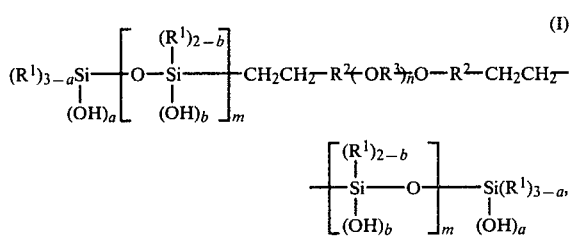

where $R^1$ is a substituted or unsubstituted monovalent hydrocarbon group or a triorganosiloxy group, $R^2$ is a divalent hydrocarbon group, a is zero, 1, 2 or 3, b is zero, 1 or 2 with the proviso that $1 \leq a+b \leq 3$, m is zero, 1 or 2 and n is a positive integer, having a molecular weight in the range from 400 to 15,000, or partial condensation product thereof, and (b) from 1 to 30 parts by weight of an organosilane or an organopolysiloxane represented by the formula

where $R^4$ is a monovalent hydrocarbon group, Y is a hydrolyzable group, d is zero or a positive number not exceeding 2 and e is a positive number not exceeding 4 with the proviso that $0 < d+e \leq 4$, and having at least two hydrolyzable group Y in a molecule, with optional admixture of a curing accelerator.

In particular, the above defined component (b) is preferably an organosilane compound represented by the general formula

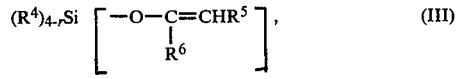

where $R^4$ has the same meaning as defined above, $R^5$ and $R^6$ are each a hydrogen atom or a monovalent hydrocarbon group individually and r is 2, 3 or 4, which is used in combination with 0.01 to 15 parts by weight of an organosilane or organopolysiloxane having, in a molecule, at least one guanidyl group represented by the general formula

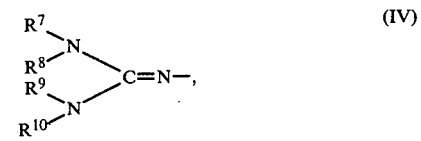

where $R^7$, $R^8$, $R^9$ and $R^{10}$ are each a monovalent hydrocarbon group.

Further, the inventive composition is optionally admixed with an α,ω-dihydroxydiorganopolysiloxane represented by the general formula

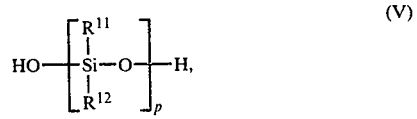

where $R^{11}$ and $R^{12}$ are each a monovalent hydrocarbon group and p is a positive integer, in an amount up to 100 parts by weight.

The basic principle of the crosslink formation in the inventive composition is the condensation reaction taking place between the component (a) and the component (b) so that the inventive composition has larger stability than in the conventional similar curable compositions utilizing hydrolyzable groups at the molecular terminals of the polyoxyalkylene polyether.

DETAILED DESCRIPTION OF THE PREFERRED EMBODIMENTS

The base component in the inventive curable composition is the component (a) represented by the above general formula (I) which is a polyoxyalkylene polyether terminated at both chain ends with the silicon-containing groups. In the general formula (I), $R^1$ is a monovalent hydrocarbon group having from 1 to 18 carbon atoms exemplified by alkyl groups such as methyl, ethyl, propyl and butyl groups, cycloalkyl groups such as cyclopentyl and cyclohexyl groups, aryl groups such as phenyl and tolyl groups and aralkyl groups such as benzyl group as well as those groups derived from the above named hydrocarbon groups by the substitution of halogen atoms, cyano groups or other substituent groups for part or all of the hydrogen atoms in the hydrocarbon groups. Alternatively, $R^1$ in the general formula (I) may be a triorganosiloxy group represented by the general formula $R_3SiO—$, where R is a substituted or unsubstituted monovalent hydrocarbon group having from 1 to 18 carbon atoms.

The divalent hydrocarbon group represented by $R^2$ in the general formula (I) has from 1 to 20 carbon atoms or, preferably, from 1 to 4 carbon atoms. The body of the molecules of the component (a) is composed of the recurring units of $—OR^3—$, in which $R^3$ is a divalent hydrocarbon group having from 1 to 4 carbon atoms exemplified by the groups $—CH_2—$, $—CH_2CH_2—$,

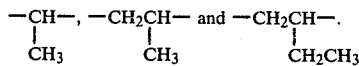

The recurring units of $(\!-OR^3\!)_{\overline{n}}$ may be composed either of a single kind of the oxyalkylene groups or of a combination of two kinds or more of the oxyalkylene groups with the alkylene groups being as shown above. For example, the recurring structure may be a so-called polyoxyethylenepolyoxypropylene structure.

The component (a) which is a polyoxyalkylene polyether modified with silicon-containing groups at the chain terminals thereof can be prepared in the manner described below. For example, a polyoxyalkylene polyether terminated at both chain ends with unsaturated groups $CH_2=CH—R^2—$, where $R^2$ has the same meaning as defined above, is subjected to the addition reaction with an organosilane or an organopolysiloxane having one hydrogen atom directly bonded to the silicon atom in a molecule and one or more of hydrolyzable atoms or groups such as halogen atoms in the presence of a platinum catalyst and the thus obtained addition product is hydrolyzed by adding water at a temperature in the range from $-10°$ C. to $130°$ C. or, preferably, from $10°$ C. to $60°$ C. to convert the hydrolyzable atoms or groups directly bonded to the silicon atoms into hydroxy groups. The number of the hydroxy groups in a molecule of the component (a) is varied according to the value of a in the general formula (I) and any kind of the compounds in conformity with the general formula (I) is suitable for use in the inventive composition regardless of the number of the hydroxy groups. A partial condensation product produced by the dehydration condensation of the silanolic hydroxy groups can also be used in the invention.

The above mentioned hydrolysis reaction to convert the hydrolyzable halogen atoms bonded to the silicon atoms into hydroxy groups is carried out preferably in the presence of an acid acceptor such as nitrogen-containing inorganic or organic basic compounds, e.g. ammonia, triethylamine, diethylamine, pyridine, picoline, urea, guanidine, tetramethylguanidine and the like and carbonates of alkali metals or alkaline earth metals, e.g. sodium hydrogencarbonate, sodium carbonate, potassium carbonate, calcium carbonate, magnesium carbonate and the like. When the hydrolyzable group is an acyloxy group, the use of an acid acceptor is not indispensable but the above named carbonates of alkali metals or alkaline earth metals are used with some advantages.

In carrying out the above described addition reaction and the hydrolysis reaction, addition of an organic solvent to the reaction mixture is not always necessary but it is of course optional to use an organic solvent according to need, for example, when the starting materials have a high viscosity to bring about difficulties in mixing and agitating the reaction mixture. The organic solvent used in the case should be inert and stable throughout the reactions and is exemplified by aromatic hydrocarbon solvents such as benzene, toluene, xylene and the like, aliphatic hydrocarbon solvents such as hexane, octane and the like, ether solvent such as diethyl ether and the like, ketone solvents such as methylethylketone and the like and halogenated hydrocarbon solvents such as trichloroethylene and the like.

The formation of the silanolic hydroxy groups can readily be confirmed by the appearance of the characteristic absorption bands assigned to the silanolic hydroxy groups in the infrared absorption spectrum or by the chemical determination of the silanolic hydroxy groups with a Grignard reagent.

The starting materials used in the above described preparation of the component (a), i.e. the silane or polysiloxane compounds having hydrolyzable atoms or groups together with a silicon-bonded hydrogen atom in a molecule and the polyoxyalkylene polyether having terminal unsaturation, are available readily as commercial products.

The component (b) in the inventive composition is an organosilane or an organopolysiloxane compound represented by the above given general formula (II) in which the symbols $R^4$, Y, d and e each have the meaning as defined above. When $d+e$ is equal to 4, the compound is an organosilane compound of $R^4{}_dY_{4-d}Si$ where d is an integer of zero, 1 or 2. On the other hand, $d+e$ is smaller than 4 when the compound is an organopolysiloxane. In this case, the general formula (II) is an average unit formula indicating the molar ratio of the individual kinds of atoms and groups. At any rate, the organosilicon compound as the component (b) must have at least two hydrolyzable groups in a molecule essentially to serve as a curing agent so as that the inventive composition is cured at room temperature by the exposure to atmospheric air.

The monovalent hydrocarbon group represented by $R^4$ is exemplified by alkyl groups such as methyl, ethyl and propyl groups, alkenyl groups such as vinyl and allyl groups, aryl groups such as phenyl and naphthyl groups and aralkyl groups such as benzyl group, and the hydrolyzable group represented by Y is exemplified by alkoxy groups, acyloxy groups, ketoxime groups, amide groups, substituted or unsubstituted amino groups and substituted or unsubstituted aminoxy groups.

The organosilicon compounds as the component (b) include organosilane compounds and organopolysiloxane compounds, which latter class of the compounds can be prepared by the partial hydrolysis condensation of the compounds of the former class. Examples of the organosilane compounds suitable as the component (b) are as follows.

(1) Alkoxy-containing silanes including di and trialkoxysilanes exemplified by dimethyldimethoxysilane, diethyldimethoxysilane, diphenyldimethoxysilane, dimethyldiethoxysilane, diethyldiethoxysilane, diphenyldiethoxysilane, methylvinyldiethoxysilane, phenylvinyldiethoxysilane, methyltrimethoxysilane, methyltriethoxysilane, methyltripropoxysilane, ethyltriethoxysilane, propyltrimethoxysilane, propyltriethoxysilane, phenyltrimethoxysilane, phenyltriethoxysilane, vinyltrimethoxysilane, vinyltriethoxysilane and the like. The organopolysiloxanes containing alkoxy groups are prepared by the partial hydrolysis condensation of one or a mixture of these di- and trialkoxysilanes, optionally, with admixture of one or more of mono- and tetraalkoxysilanes.

(2) Acyloxy-containing silanes including di- and triacyloxysilanes exemplified by dimethyldiacetoxysilane, diethyldiacetoxysilane, diphenyldiacetoxysilane, methylvinyldiacetoxysilane, methyltriacetoxysilane, ethyltriacetoxysilane, phenyltriacetoxysilane, vinyltriacetoxysilane and the like. The organopolysiloxanes containing acyloxy groups are prepared by the partial hydrolysis condensation of one or a mixture of these di- and triacyloxysilanes, optionally, with admixture of one or more of mono- and tetraacyloxysilanes.

(3) Ketoxime-containing silanes including bis- and trisketoximesilanes exemplified by dimethyl bis(methylethylketoxime)silane, methylvinyl bis(methylethylketoxime)silane, methyl tris(dimethyloxime)silane, methyl tris(methylethylketoxime) silane, ethyl tris(dimethylketoxime)silane, ethyl tris (methylethylketoxime)silane, vinyl tris(dimethylketoxime) silane, vinyl tris(methylethylketoxime)silane, phenyl tris (dimethylketoxime)silane, phenyl tris(methylethylketoxime) silane, tetrakis(methylethylketoxime)silane and the like. The organopolysiloxanes containing ketoxime groups are prepared by the partial hydrolysis condensation of one or a mixture of these ketoxime-containing silanes.

(4) Amidosilanes including bis- and trisamidosilanes exemplified by dimethyl bis(N-methylformamido)silane, dimethyl bis(N-methylacetamido)silane, diethyl bis(N-methylformamido) silane, diethyl bis(N-methylacetamido)silane, diphenyl bis(N-methylformamido)silane, diphenyl bis(N-methylacetamido)silane, methylvinyl bis(N-methylformamido)silane, methylvinyl bis(N-methylacetamido)silane, methyl tris(formamido)silane, methyl tris(acetamido)silane, methyl tris(N-methylformamido) silane, methyl tris(N-methylacetamido)silane, phenyl tris (formamido)silane, phenyl tris(acetamido)silane, phenyl tris(N-methylformamido)silane, phenyl tris(N-methylacetamido)silane, vinyl tris(formamido)silane, vinyl tris(acetamido)silane, vinyl tris(N-methylformamido)silane, vinyl tris(N-methylacetamido)silane and the like. The organopolysiloxanes containing amido groups are prepared by the partial hydrolysis condensation of one or a mixture of these amido-containing silanes.

(5) Aminosilanes including bis- and trisaminosilanes exemplified by dimethyl bis(N,N-dibutylamino)silane, diethyl bis(N,N-dibutylamino)silane, diphenyl bis(N,N-dibutylamino)silane, methyl tris(N-butylamino)silane, ethyl tris(N-butylamino)silane, phenyl tris(N-butylamino)silane, vinyl tris (N-butylamino)silane and the like. The amino group-containing organopolysiloxanes are prepared by the partial hydrolysis condensation of one or a mixture of these amino-containing silanes.

(6) Aminoxy-containing silanes including bis-, tris- and tetrakis aminoxysilanes exemplified by dimethyl bis(N,N-diethylaminoxy)silane, diethyl bis(N,N-diethylaminoxy)silane, diphenyl bis(N,N-diethylaminoxy)silane, methylvinyl bis(N,N-diethylaminoxy)silane, dimethyl bis(N,N-diphenylaminoxy)silane, methyl tris(N,N-diphenylaminoxy)silane, tetrakis(N,N-diphenylaminoxy)silane, methyl tris(N,N-diethylaminoxy)silane, tetrakis(N-methyl-N-ethylaminoxy)silane, ethyl tris(N,N-diethylaminoxy)silane, phenyl tris(N,N-dipropylaminoxy)silane, 3-chloropropylmethyl bis(N,N-dimethylaminoxy)silane, a silane compound expressed by the structural formula

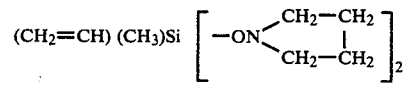

and the like. The organopolysiloxanes containing aminoxy groups are prepared by the partial hydrolysis condensation of one or a mixture of these aminoxy-containing silanes.

(7) Alkenyloxy-containing silanes exemplified by methyl tris(isopropenoxy)silane, a silane compound expressed by the structural formula

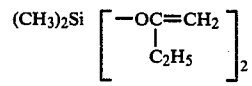

and the like. A typical example of the organopolysiloxanes containing alkenyloxy groups is 1,3-divinyl-1,1,3,3-tetrakis(isopropenoxy)disiloxane.

All of the above named organosilanes and organopolysiloxanes have at least two hydrolyzable groups in a molecule. The organopolysiloxanes may have a linear molecular structure with two or more of the silicon atoms or a cyclic structure with at least three silicon atoms.

The component (b) serves as a crosslinking agent of the component (a) to give a cured product of the composition and, when the component (a) has only two silanolic hydroxy groups in a molecule, it is desirable that the component (b) has at least three hydrolyzable groups in a molecule in order to obtain a sufficient degree of crosslinking.

The amount of the component (b) formulated with the component (a) in the inventive composition is desirably in the range from 1 to 30 parts by weight per 100 parts by weight of the component (a). When the amount is smaller than 1 part by weight, the cured products obtained therewith cannot have excellent rubbery elasticity and mechanical strengths while an excessive amount of the component (b) leads to the formation of brittle cured products with poor elasticity.

As is stated before, the inventive composition may contain a curing accelerator, if desired, to accelerate the crosslink formation between the components (a) and (b) in the presence of moisture. The curing accelerator is, however, not always indispensable and, for example, sufficiently high curing velocities can be obtained even without the addition of a curing agent when the component (b) is an aminoxy-containing organosilicon compound.

Several examples of the curing accelerators suitable for use in the invention are metal salts of carboxylic acids such as ethyllead octoate, dibutyltin dilaurate, dibutyltin diacetate, dibutyltin distearate, iron 2-ethylhexoate, titanium naphthenate, zinc stearate and the like, organic esters of titanic acid such as tetrabutyl titanate, triethanolamine titanate, tetra(isopropenoxy) titanate and the like, organotitanium compounds such as $\beta$-carbonyl titanium and the like, aminoalkyl-containing silane compounds such as 3-aminopropyl triethoxysilane, N-(trimethoxysilylpropyl) ethylenediamine and the like, amines and salts thereof such as hexylamine, dodecylamine phosphate and the like, quaternary ammonium salts such as benzyl triethylammonium acetate and the like and alkali metal salts of lower carboxylic acids such as potassium acetate, sodium oxalate and the like. These curing accelerators may be used either singly or as a combination of two kinds or more.

Since the curing accelerator is added to the inventive composition merely with an object of accelerating the curing reaction of the composition, the amount of the curing accelerator in the composition should be limited as small as possible in so far as a tolerably high curing velocity is obtained. When the amount of the curing accelerator, e.g. a metal salt, is excessively large in the composition, various undesirable effects are brought about in the physical properties of the cured products. In this connection, the amount of the curing accelerator is desirably 10 parts by weight or smaller per 100 parts by weight of the component (a) although it should be determined according to the kind of the curing accelerator and the desired curing velocity.

The inventive room temperature-curable composition is essentially composed of the components (a) ad (b) with optional admixture of the curing accelerator. When an improvement in the properties of the cured products is desired as described below, however, an $\alpha,\omega$-dihydroxydiorganopolysiloxane represented by the general formula (V) given previously is further added to the composition.

This hydroxy-terminated diorganopolysiloxane of the general formula (V) possibly reacts with the component (b) in addition to the component (a) to effect curing of the composition so that the cured products obtained with the addition of this hydroxy-terminated diorganopolysiloxane are imparted with several excellent properties inherent to organopolysiloxanes such as the heat resistance, anti-freeze resistance, resistance against photo-induced degradation, anti-chemicals resistance, electric properties and the like.

The amount of the hydroxy-terminated diorganopolysiloxane is, however, limited not to exceed 100 parts by weight or, preferably, 50 parts by weight per 100 parts by weight of the component (a) from the standpoint of obtaining a cured product of which the main ingredient is the component (a). It is of course optional according to need that the amount of the hydroxy-terminated diorganopolysiloxane exceeds the amount of the component (a).

In the general formula (V) representing the hydroxy-terminated diorganopolysiloxane, $R^{11}$ and $R^{12}$ are each a substituted or unsubstituted monovalent hydrocarbon group exemplified by alkyl groups, aryl groups and alkenyl groups as well as those groups obtained by substituting halogen atoms, cyano groups and other substituent atoms or groups for part or all of the hydrogen atoms in the hydrocarbon groups. The symbol p in the general formula (V) is a positive integer corresponding to the degree of polymerization of the polysiloxane such that the viscosity of the polysiloxane is in the range frame 100 to 500,000 centistokes at 25° C. As is shown typically by the general formula (V), this hydroxy-terminated diorganopolysiloxane has desirably a substantially linear molecular configuration constructed with the difunctional siloxane units alone excepting the terminal monofunctional groups but trifunctional or tetrafunctional siloxane units may be involved in the molecular structure though in a limited amount.

The procedure for the preparation of the inventive composition is conventional and the above described components are merely uniformly blended together by use of an ordinary blending machine as is used hitherto, for example, in the preparation of a room temperature-curable silicone rubber composition. The inventive composition is further admixed optionally with various kinds of conventional additives, according to need, such as fillers, coloring agents, e.g. pigments, plasticizers, thermal stabilizers, anti-freeze improvers, flame retardants, thixotropy-imparting agents, moisture absorbents, fungicides, adhesion improvers, e.g. so-called carbon-functional organosilane compounds having amino groups, epoxy groups, thiol groups and the like, metal salts of carboxylic acids, metal alcoholates and the like.

Among the above mentioned additives, in particular, fillers are most desirably formulated in the inventive composition in order to have improved mechanical properties of the cured products. The fillers suitable for use include particulate and fibrous fillers exemplified by fumed silica, precipitated silica, powdered quartz, diatomaceous earth, calcium carbonate, magnesium carbonate, carbon black, clay, calcined clay, titanium dioxide, zinc oxide, $\alpha$- and $\gamma$-iron oxides, bentonite, organic complexes or bentonite, glass powder, glass microballoons, asbestos, glass fiber and the like. The surface of these fillers may be treated with known surface treatment agents.

The inventive composition can be stored as ready-mixed in one package with stability when moisture is excluded. When such a one-package preparation is desired, the component (a) is first admixed with the optional components of the hydroxy-terminated diorganopolysiloxane, fillers, plasticizers and others in a dry condition followed by the addition of the component (b) and, optionally, the curing accelerator into a uniform mixture which is packaged in tubes of a plastic or aluminum foil to prevent the influence of the atmospheric moisture. When sealed hermetically, the composition exhibits no viscosity increase or gelation even after a prolonged storage whereas it is rapidly cured when extruded from the tube to the open air into a rubbery elastomer by the influence of the atmospheric moisture.

When further improved storage stability of the composition is desired, the composition is prepared in two packages, of which one package contains the component (a) together with optional admixture of the curing accelerator and the hydroxy-terminated diorganopolysiloxane as well as major portions of the fillers, plasticizers and other additives and the other package contains the component (b) and, optionally, the remainder of the fillers, plasticizers and other additives. The contents of the individual packages can be kept without viscosity increase for a very long time of storage and blended together just before use into a uniform curable composition which is readily cured into a rubbery elastomer by the influence of the atmospheric moisture similarly to the one-package type composition.

As is described before, several classes of organosilane or organopolysiloxane compounds are used as the essential component (b) in the inventive composition. These different types of the organosilicon compounds have their respective advantages and disadvantages. It has been unexpectedly discovered that the use of the alkenyloxy-containing silane compounds is particularly advantageous when so-called tack-free time of the surface, i.e. the time of the disappearance of tackiness on the surface of the composition when it is exposed to the atmospheric air, is desired to be shortened or when uniform curing to the depth of a relatively thick layer of the composition within a short time is desired. The alkenyloxy-containing organosilane compounds are represented by the general formula (III) given before. The symbols $R^4$, $R^5$, $R^6$ and r each have the meaning as given before but it is recommended that $R^5$ and $R^6$ are not simultaneously hydrogen atoms. In other words, vinyloxy group is less preferred as the alkenyloxy group bonded to the silicon atom of the silane compound.

The alkenyloxy-containing silane compounds suitable for use with the above purpose are exemplified by methyl tris (isopropenoxy)silane, methylvinyl bis(isopropenoxy)silane, phenyl tris(isopropenoxy)silane, propyl tris(isopropenxoy)silane, tetrakis(isopropenoxy)silane, methyl tris(1-phenyl-1-ethenyloxy)silane, methyl tris(1-isobutenyloxy)silane, methyl tris(1,4-dimethyl-1,3-pentadienyloxy)silane and the like. The organopolysiloxanes derived from these silane compounds by the partial hydrolysis condensation of one or a mixture of the silane compounds are also suitable in place of the silane compounds.

It is also noted that the silane compounds or organopolysiloxane compounds obtained by the partial substitution of the other kinds of hydrolyzable groups, e.g. alkoxy groups, ketoxime groups, amino groups, aminoxy groups and the like for the alkenyloxy groups in the above described α- and/or β-substituted alkenyloxy-containing silane compounds or organopolysiloxane compounds are also suitable for the purpose. Several of the examples of such organosilicon compounds are methyl bis(isopropenoxy) methoxysilane, methy bis(isopropenoxy) methylethylketoxime silane, methyl bis(isopropenoxy) diethylaminosilane, methyl bis(isopropenoxy) diethylaminoxysilane and the like. The organopolysiloxanes as the products of the partial hydrolysis condensation of one or a mixture of these silane compounds are also suitable.

The amount of the component (b) of this class is from 1 to 30 parts by weight or, preferably, from 4 to 20 parts by weight per 100 parts by weight of the component (a).

The advantages of the above described alkenyloxy-containing organosilicon compound are more fully exhibited when the composition is further admixed with a guanidyl-containing organosilane or organopolysiloxane compound, where the guanidyl group is represented by the general formula (IV) given before. This compound is a curing catalyst which serves simultaneously as a curing accelerator of the composition and as a catalyst for the hydrolysis reaction of the α- and/or β-substituted alkenyloxy-containing organosilicon compound as the component (b). Several examples of the suitable compounds are expressed by the following structural formulas, in which Me, Et, Pr and Ph stand for methyl, ethyl, propyl and phenyl groups, respectively. Partial hydrolysis condensation products of the silane compounds are also suitable.

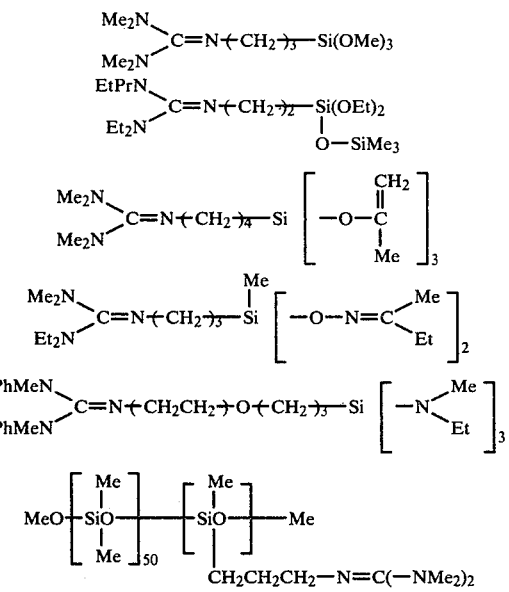

The amount of these guanidyl-containing organosilicon compounds in the inventive composition is usually in the range from 0.01 to 15 parts by weight or, preferably from 0.1 to 8 parts by weight per 100 parts by weight of the component (a). It is natural that any smaller amounts of this component than above cannot give the desired advantages of shortening of the tack-free time and acceleration of cure in the depth of a thick layer while an excessive amount over 15 parts by weight results in an inconvenience in working with the composition due to the too rapid film formation with the tack-free time of as short as a few seconds or less in addition to the problem of coloring of the cured products by the decomposition of the guanidyl groups.

The most preferred guanidyl-containing organosilicon compound is 3-(tetramethylguanidyl)propyl trimethoxysilane. The guanidyl-containing organosilane and organopolysiloxane compounds including this compound can be synthesized by the reaction of a tetraorganoguanidine, e.g. tetra methylguanidine, with a halogenated organosilane or halogenated organopolysiloxane in the presence of an acid acceptor.

Although the above described guanidyl-containing organosilicon compound serves as a curing accelerator, it is optional, if desired, to use the other kinds of the curing accelerators as described before in combination therewith.

The inventive curable compositions as described above in detail are free from the problem of noxious gaseous products produced in the process of curing with unpleasant odor, toxicity and corrosiveness and do not form rust on the metal surface in contact therewith. The compositions are stable over a long period of time when kept in a dry condition but are rapidly cured when exposed to atmospheric air containing moisture to give a rubbery elastomer with good mechanical properties. Utilizing these excellent characteristics, the inventive compositions can find wide applications in various fields such as a sealing material, shaping material by molding, wrapping or packaging material for foodstuffs and the like.

Following are the examples of the present invention to describe the inventive curable composition in further detail, in which the preparation of the silanolic hydroxy-containing polyoxyalkylene polyethers as the component (a) is first described.

EXAMPLE 1

A reaction mixture was formed by introducing into a flask 300 g of a polyoxypropylene terminated at both chain ends with allyloxy groups and having a viscosity of about 790 centistokes at 25° C. corresponding to an average molecular weight of about 4100, 26 g of 1,1,1,3-tetramethyl-3-chlorodisiloxane, 0.3 g of a solution of chloroplatinic acid in isopropyl alcohol containing about 2% by weight of platinum and 200 g of toluene and the reaction mixture was heated first at 40° C. for 1 hour and then at 110° C. for 3 hours with agitation to effect the addition reaction between the allyl groups of the polyoxypropylene and the silicone-bonded hydrogen atoms of the disiloxane.

After completion of the above addition reaction, 20 g of triethylamine was added to the reaction mixture and 5 g of water was then added dropwise thereinto under agitation over a period of 15 minutes at 20° C. followed by further agitation for 1 hour at the same temperature to effect the hydrolysis reaction of the silicon-bonded chlorine atoms.

The precipitated hydrochloride of triethylamine was removed by filtration and toluene was distilled off under reduced pressure at 60° C. to leave 309 g of a yellowish brown viscous liquid product having a viscosity of 980 centistokes at 25° C. This liquid product had an average molecular weight of about 4400 and was identified to be a polyoxyalkylene polyether terminated at both chain ends with silanolic hydroxy groups as expressed by the structural formula given below, in which p is a positive number of about 69 on an average and Me is a methyl group. This product is referred to as POA-1 hereinafter.

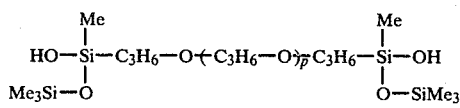

EXAMPLE 2

A reaction mixture was formed by introducing into a flask 300 g of a polyoxypropylene terminated at both chain ends with allyloxy groups and having a viscosity of about 2200 centistokes at 25° C. corresponding to an average molecular weight of about 6000, 21 g of 1,1,1,3-tetramethyl-3-acetoxydisiloxane, 0.3 g of the same solution of chloroplatinic acid as used in Example 1 and 200 g of toluene and the reaction mixture was heated first at 40° C. for 1 hour and then at 110° C. for 3 hours with agitation to effect the addition reaction between the allyl groups of the polyoxypropylene and the silicon-bonded hydrogen atoms of the disiloxane.

After completion of the above addition reaction, 1.5 g of sodium hydrogencarbonate was added to the reaction mixture and then 5 g of water was added dropwise thereinto with agitation over a period of 15 minutes followed by further agitation at 110° C. for 2 hours to effect the hydrolysis of the acetoxy groups into hydroxy groups.

The precipitated sodium acetate was removed by filtration and toluene was distilled off under reduced pressure at 60° C. to leave 310 g of a liquid product having an average molecular weight of about 6300, which was identified to be a silanol-terminated polyoxypropylene expressed by the following structural formula, in which p is a positive number of about 102 on an average. This liquid product is referred to as POA-II hereinafter.

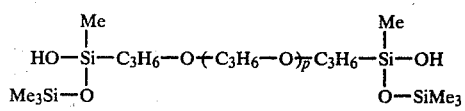

EXAMPLE 3

A reaction mixture was formed by introducing into a flask 300 g of a polyoxypropylene terminated at both chain ends with allyloxy groups and having a viscosity of about 5100 centistokes at 25° C. corresponding to an average molecular weight of about 9100, 16 g of 1,1,1,3-tetramethyl-3-methoxydisiloxane, 0.3 g of the same solution of chloroplatinic acid as used in Example 1 and 200 g of toluene and the reaction mixture was heated first at 40° C. for 1 hour and then at 110° C. for 3 hours with agitation to effect the addition reaction between the allyl groups of the polyoxypropylene and the silicon-bonded hydrogen atoms of the disiloxane.

After completion of the above addition reaction, 0.1 g of tetramethylguanidine and 10 g of water were added to the reaction mixture which was heated at 60° C. for 2 hours with agitation to effect hydrolysis of the methoxy groups into hydroxy groups. Removal of the methyl alcohol as the by-product and toluene by distillation under reduced pressure at 60° C. for 2 hours gave 302 g of a liquid product having an average molecular weight of about 11,800 which was identified to be a mixture of polyoxypropylenes expressed by the average formula given below. This product is referred to as POA-III hereinafter.

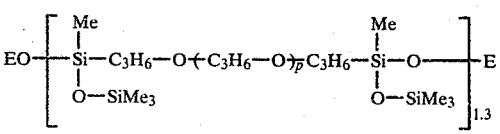

In the above formula, E is a hydrogen atom H or a methyl group Me, the molar ratio of H/Me being 0.8:0.2, and p is a positive number of about 155 on an average.

EXAMPLE 4

A reaction mixture was formed by introducing into a flask 300 g of a polyoxypropylene terminated at both chains ends with allyloxy groups and having a viscosity of about 790 centistokes at 25° C. corresponding to an average molecular weight of about 4100, 18.5 g of methyldichlorosilane, 0.3 g of the same solution of chloroplatinic acid as used in Example 1 and 200 g of toluene and the reaction mixture was heated first at 40° C. for 1 hour and then at 110° C. for 3 hours with agitation to effect the addition reaction between the allyl groups at the chain ends of the polyoxypropylene and the silicon-bonded hydrogen atoms of the silane compound.

After completion of the above addition reaction, 35 g of triethylamine was added to the reaction mixture, 13.5 g of trimethylsilanol was added dropwise with agitation at 15° C. over a period of 15 minutes and finally 3 g of water was added to the reaction mixture with agitation at 15° C. over a period of 15 minutes followed by further agitation at 20° C. to effect hydrolysis of the chlorine atoms bonded to the silicon atoms.

The precipitated hydrochloride of triethylamine was removed by filtration and toluene was distilled off under reduced pressure at 60° C. to leave 310 g of a liquid product having an average molecular weight of about 4400 which was identified to be a silanol-terminated polyoxypropylene expressed by the structural formula given below, in which p is a positive number of about 69 on an average. This liquid product is referred to as POA-IV hereinafter.

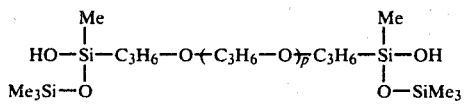

EXAMPLE 5

Into a flask were introduced 27 g of 1,1,3,3-tetramethyldisiloxane, 0.3 g of the same solution of chloroplatinic acid as used in Example 1 and 200 g of toluene and into the above mixture heated under reflux was added dropwise 300 g of a polyoxypropylene terminated at both chain ends with allyloxy groups and having a viscosity of about 790 centistokes at 25° C. corresponding to an average molecular weight of about 4100 over a period of about 30 minutes followed by further agitation under reflux for 3 hours to effect the addition reaction between the allyl groups at the chain ends of the polyoxypropylene and the silicon-bonded hydrogen atoms.

After completion of the above addition reaction, the unreacted 1,1,3,3-tetramethyldisiloxane and toluene were distilled off under reduced pressure at 60° C. to leave a liquid product having silicon-bonded hydrogen atoms at the chain terminals of polyoxypropylene. This product was admixed with 200 g of dioxane and 4 g of water at 20° C. and agitated first at 20° C. for 2 hours and then at 60° C. for 1 hour to effect the reaction. Removal of dioxane by distillation under reduced pressure at 60° C. gave 303 g of a liquid product which was identified to be a polyoxypropylene terminated at both chain ends with silanolic hydroxy groups and expressed by the structural formula given below, in which p is a number of about 69 on an average. This product is referred to as POA-V hereinafter.

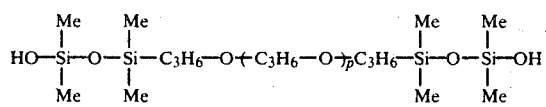

EXAMPLE 6

The same procedure as in Example 1 was repeated except that 26 g of 1,1,1,3-tetramethyl-3-chlorodisiloxane was replaced with 15 g of dimethylchlorosilane. The resultant product obtained after the hydrolysis reaction was a polyoxypropylene terminated at both chain ends with silanolic hydroxy groups having an average molecular weight of about 4300 and expressed by the following structural formula, in which p is a number of about 69 on an average. The yield of this product, which is referred to as POA-VI hereinafter, was 304 g.

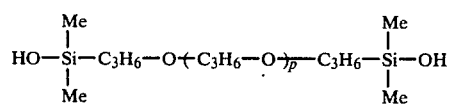

EXAMPLE 7

A reaction mixture was formed by introducing into a flask 300 g of a polyoxypropylene terminated at both chain ends with allyloxy groups and having a viscosity of about 2200 centistokes at 25° C. corresponding to an average molecular weight of about 6000, 11.5 g of dimethylchlorosilane, 0.3 g of the same solution of chloroplatinic acid as used in Example 1 and 200 g of toluene and the reaction mixture was heated with agitation first at 40° C. for 1 hour and then at 110° C. for 3 hours to effect the addition reaction between the allyl groups of the polyoxypropylene and the silicon-bonded hydrogen atoms of the silane compound.

After completion of the above addition reaction, 12 g of triethylamine was added to the reaction mixture and further 2.5 g of water was added at 30° C. with agitation followed by heating at 40° C. for 2 hours with continued agitation. The precipitated hydrochloride of triethylamine was removed by filtration and toluene was distilled off under reduced pressure at 60° C. to leave 305 g of a yellowish brown liquid product having a viscosity of 2520 centistokes at 25° C. corresponding to an average molecular weight of about 6200. This product, which is referred to as POA-VII hereinafter, was identified to be a polyoxypropylene terminated at both chain ends with silanolic hydroxy groups and expressed by the following structural formula, in which p is a number of about 102 on an average.

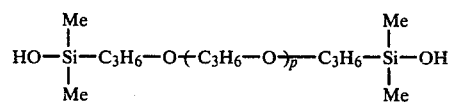

EXAMPLE 8

A reaction mixture was formed by introducing into a flask 300 g of a polyoxypropylene terminated at both chain ends with allyloxy groups and having a viscosity of about 790 centistokes at 25° C. corresponding to an average molecular weight of about 4100, 18.5 g of methyldichlorosilane, 0.3 g of the same solution of chloroplatinic acid as used in Example 1 and 200 g of toluene and the reaction mixture was heated with agitation first at 40° C. for 1 hour and then at 110° C. for 3 hours to effect the addition reaction between the allyl groups at the chain ends of the polyoxypropylene and the silicon-bonded hydrogen atoms of the silane compound.

After completion of the addition reaction, the reaction mixture was added dropwise into a mixture composed of 50 g of toluene, 50 g of triethylamine and 9 g of water over a period of 30 minutes at 0° C. with agitation followed by further agitation at 30° C. for additional 2 hours to effect the hydrolysis reaction of the silicon-bonded chlorine atoms into hydroxy groups. The precipitated hydrochloride of triethylamine was removed by filtration and toluene was stripped off under reduced pressure at 60° C. to leave 306 g of a liquid product having an average molecular weight of about 4200. This product was identified to be a polyoxypropylene polyether terminated at both chain ends with silanolic hydroxy groups as expressed by the following structural formula, in which p is a positive number of about 69 on an average.

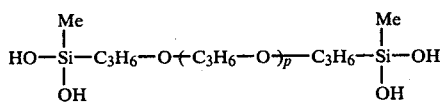

This product is referred to as POA-VIII hereinafter.

EXAMPLE 9 (Compositions I to III)

The base polymers for the Compositions I, II and III were 100 parts by weight (hereinafter "parts by weight" is simply given as "parts") of POA-I, 100 parts of POA-VI and a blend of 80 parts of POA-I and 20 parts of a dimethylpolysiloxane terminated at both chain ends with hydroxy groups and having a viscosity of about 5000 centistokes at 25° C., respectively, and each 100 parts of the base polymer was blended with 15 parts of dibutyl phthalate, 80 parts of precipitated calcium carbonate, 0.2 part of dibutyltin dilaurate and 9.76 parts of methyl tris(cyclohexylamino) silane uniformly into a composition which was shaped into a sheet of 2 mm thickness and kept in an atmosphere of 60% relative humidity at 20° C. for 7 days into a cured elastomeric sheet.

The mechanical properties of the thus obtained cured sheets were examined according to the procedures specified in JIS K 6301 directly after curing of 7 days or 7 days curing followed by 14 days of thermal aging at 110° C. or followed by 1000 hours of accelerated weathering under irradiation with ultraviolet light in a weathering accelerator with intermittent showering with water for 18 minutes in every 120 minutes sprayed with a water pressure of 1 kg/cm². The results are set out in Table 1 below.

EXAMPLE 10 (Composition IV)

A curable composition was prepared by uniformly blending 100 parts of POA-I with 6 parts of ethyltrimethoxysilane and 1 part of dibutyltin dilaurate and the composition was shaped into a sheet of 2 mm thickness which was cured by keeping in an atmosphere of 60% relative humidity at 20° C. for 7 days into an elastomeric sheet. The mechanical properties of this sheet were; elongation 210%, tensile strength 7.1 kg/cm²; and hardness 10.

| Composition No. | Condition of sample | Elongation, % | Tensile strength, kg/cm² | Hardness |
|---|---|---|---|---|
| I | As cured | 380 | 12.4 | 27 |
|  | After thermal aging | 240 | 14.3 | 29 |
|  | After accelerated weathering | 270 | 8.2 | 21 |
| II | As cured | 350 | 11.5 | 26 |
|  | After thermal aging | 180 | 14.0 | 30 |
|  | After accelerated weathering | 170 | 6.8 | 18 |
| III | As cured | 520 | 12.2 | 25 |
|  | After thermal aging | 500 | 12.7 | 25 |
|  | After accelerated weathering | 480 | 11.5 | 22 |

EXAMPLE 11 (Composition V)

A curable composition was prepared by uniformly blending 100 parts of POA-I, 15 parts of dibutyl phthalate, 80 parts of precipitated calcium carbonate, 0.5 part of dibutyltin dilaurate and 9.78 parts of vinyl trimethoxysilane and the composition was shaped into a sheet of 2 mm thickness, which was cured by keeping in an atmosphere of 60% relative humdity at 20° C. for 7 days into an elastomeric sheet. The mechanical properties of this cured sheet were: elongation 360%, tensile strength 14.6 kg/cm²; and hardness 24.

EXAMPLE 12 (Compositions VI to X)

Five kinds of curable compositions were prepared each by uniformly blending in a three-roller mill 100 parts of either one of POA-I to POA-V prepared in Examples 1 to 5 with 15 parts of dibutyl phthalate, 80 parts of precipitated calcium carbonate, 0.1 part of dibutyltin dilaurate and 15.6 parts of methyl tris(methylethylketoxime)silane. These compositions were called Compositions VI to X, respectively.

These compositions were shaped each into a sheet of 2 mm thickness which was cured by keeping in an atmosphere of 60% relative humidity at 20° C. for 7 days into an elastomeric sheet. The mechanical properties of these cured sheets are set out in Table 2 below.

Further, each of the compositions was packaged into a tube of aluminum foil with hermetic sealing and kept at 50° C. for 14 days. Each of the compositions did not show any recognizable change in its flowability after this storage test and shaped and cured into an elastomeric sheet of 2 mm thickness as in the case with the compositions as prepared. The mechanical properties of the cured sheets prepared after the storage test are also set out in Table 2.

| Composition No. | POA | As prepared | | | After storage test | | |
|---|---|---|---|---|---|---|---|
|  |  | Elongation, % | Tensile strength, kg/cm² | Hardness | Elongation, % | Tensile strength, kg/cm² | Hardness |
| VI | I | 320 | 14.9 | 26 | 330 | 13.6 | 24 |
| VII | II | 410 | 11.8 | 21 | 450 | 11.0 | 20 |
| VIII | III | 390 | 8.8 | 12 | 360 | 7.3 | 10 |
| IX | IV | 330 | 13.8 | 24 | 370 | 13.5 | 24 |

-continued

| Composition No. | POA | As prepared | | | After storage test | | |
|---|---|---|---|---|---|---|---|
| | | Elongation, % | Tensile strength, kg/cm² | Hardness | Elongation, % | Tensile strength, kg/cm² | Hardness |
| X | V | 310 | 15.2 | 27 | 320 | 14.6 | 25 |

EXAMPLE 13 (Compositions XI to XIII)

Three kinds of curable compositions (Compositions XI to XIII) were prepared each by uniformly blending in a three-roller mill 100 parts of POA-1, 15 parts of dibutyl phthalate, 80 parts of precipitated calcium carbonate and 9.75 parts of either one of the curing agents which were a 85:15 by weight mixture of the aminoxysiloxane A and aminoxysiloxane B as defined by the structural formulas below, in which Bu is a butyl group, 50:50 by weight mixture of the aminoxysiloxane A and aminoxysiloxane B and the aminoxysiloxane B alone, respectively, for Compositions XI to XIII.

Aminoxysiloxane A:

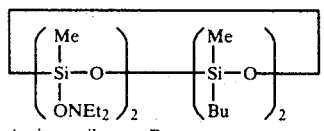

Aminoxysiloxane B:

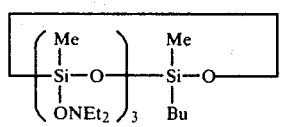

Each of the above compositions was shaped and cured into a cured elastomeric sheet of 2 mm thickness by keeping in an atmosphere of 60% relative humidity at 20° C. for 7 days and the mechanical properties of these cured sheets were examined directly after 7 days curing or 7 days curing followed by thermal aging at 110° C. for 14 days or followed by 1000 hours of accelerated weathering in the same manner as in Example 9 to give the results set out in Table 3 below.

TABLE 3

| Composition No. | Condition of sample | Elongation, % | Tensile strength, kg/cm² | Hardness |
|---|---|---|---|---|
| XI | As cured | 770 | 8.5 | 13 |
| | After thermal aging | 610 | 10.2 | 15 |
| | After accelerated weathering | 640 | 6.3 | 10 |
| XII | As cured | 520 | 12.7 | 15 |
| | After thermal aging | 370 | 15.1 | 22 |
| | After accelerated weathering | 410 | 9.4 | 12 |
| XIII | As cured | 420 | 15.6 | 23 |
| | After thermal aging | 300 | 18.0 | 25 |
| | After accelerated weathering | 340 | 13.7 | 18 |

EXAMPLE 14 (Composition XIV to XVI)

The same experimental procedure as in Example 13 was repeated except that POA-I was replaced with equal amount of POA-VI prepared in Example 6. The curing agents were, as in Example 13, 85:15 mixture of the aminoxysiloxane A and aminoxysiloxane B, 50:50 mixture of these two aminoxysiloxanes and the aminoxysiloxane B alone for Compositions XIV, XV and XVI, respectively. The results of measurements of the mechanical properties were as set out in Table 4 below.

TABLE 4

| Composition No. | Condition of sample | Elongation, % | Tensile strength, kg/cm² | Hardness |
|---|---|---|---|---|
| XIV | As cured | 750 | 8.4 | 13 |
| | After thermal aging | 490 | 11.2 | 16 |
| | After accelerated weathering | 580 | 4.8 | 8 |
| XV | As cured | 500 | 12.0 | 14 |
| | After thermal aging | 290 | 16.3 | 22 |
| | After accelerated weathering | 300 | 7.8 | 11 |
| XVI | As cured | 410 | 14.7 | 22 |
| | After thermal aging | 230 | 17.6 | 26 |
| | After accelerated weathering | 250 | 11.5 | 15 |

EXAMPLE 15 (Composition XVII)

A curable composition was prepared by uniformly blending 100 parts of POA-VII, 6 parts of vinyl tris(isopropenoxy)silane and 1 part of 3-trimethoxysilylpropyl tetramethylguanidine and this composition was shaped and cured into a rubbery sheet of 2 mm thickness by keeping in an atmosphere of 60% relative humidity at 20° C. for 7 days. The mechanical properties of the thus obtained sheet were: elongation 280%; tensile strength 10.2 kg/cm²; and hardness 16.

EXAMPLE 16 (Composition XVIII)

A curable composition was prepared by uniformly blending in a three-roller mill 100 parts of POA-VII, 25 parts of fumed silica filler having a specific surface area of 200 m²/g with its surface blocked with trimethylsilyl groups, 7.5 parts of methyl tris(1-isobutenyloxy)silane and 0.625 part of 3-dimethoxymethylsilylpropyl tetramethylguanidine and the composition was shaped and cured into a rubbery sheet by keeping in an atmosphere of 60% relative humidity at 20° C. for 7 days. The mechanical properties of the thus obtained sheet were: elongation 420%; tensile strength 28 kg/cm²; and hardness 37.

EXAMPLE 17 (Composition XIX to XXIII)

Five kinds of curable compositions (Compositions XIX to XXIII) were prepared each by uniformly blending in a three-roller mill 100 parts of either one of POA-II, POA-IV, POA-V, POA-VII and POA-VIII, respectively, 50 parts of dibutyl phthalate, 150 parts of precipitated calcium carbonate, 18 parts of methyl tris(isopropenoxy)silane and 1.5 parts of 3-trimethoxysilylpropyl tetramethylguanidine in a substantially anhydrous condition and each of the compositions was shaped and cured into a rubbery sheet of 2 mm thickness by keeping in an atmosphere of 60% relative humidity at 20° C. for 7 days. The mechanical properties of these rubbery sheets were as shown in Table 5 below.

Further, each of the compositions was packaged in a tube of aluminum foil with hermetic sealing and kept at 50° C. for 14 days. The flowability of these compositions after the above storage test was found unchanged. The compositions after this storage test were shaped and cured into rubbery sheets in the same manner as above and the mechanical properties of them were determined to give the results also set out in Table 5.

TABLE 5

| Compo-sition No. | POA | As prepared | | | After storage test | | |
|---|---|---|---|---|---|---|---|
| | | Elonga-tion, % | Tensile strength, kg/cm² | Hard-ness | Elonga-tion, % | Tensile strength, kg/cm² | Hard-ness |
| XIX | II | 630 | 23 | 29 | 640 | 24 | 28 |
| XX | IV | 590 | 25 | 32 | 620 | 23 | 29 |
| XXI | V | 670 | 22 | 27 | 680 | 20 | 25 |
| XXII | VII | 680 | 20 | 27 | 700 | 20 | 26 |
| XXIII | VIII | 430 | 26 | 33 | 450 | 25 | 30 |

EXAMPLE 18 (Compositions XXIV and XXV)

Two kinds of curable compositions (Compositions XXIV and XXV) were prepared each by uniformly blending in a three-roller mill 100 parts of a base polymer which was either a 80:20 by weight mixture of POA-II and a dimethylpolysiloxane terminated at both chain ends with hydroxy groups and having a viscosity of about 5000 centistokes at 25° C. or POA-II alone, respectively, 40 parts of dioctyl phthalate, 140 parts of precipitated calcium carbonate, 16.8 parts of vinyl tris-(isopropenoxy)silane and 1.4 parts of 3-trimethoxysilyl-propyl tetramethylguanidine and each of these compositions was shaped and cured into a rubbery sheet of 2 mm thickness by keeping in an atmosphere of 60% relative humidity at 20° C. for 7 days.

The mechanical properties of these cured sheets were examined directly after the 7 days curing or 7 days curing followed by thermal aging at 90° C. for 14 days or followed by accelerated weathering of 600 hours under the same conditions as in Example 9. The results are set out in Table 6 below.

TABLE 6

| Compo-sition No. | Condition of sample | Elonga-tion, % | Tensile strength, kg/cm² | Hardness |
|---|---|---|---|---|
| XXIV | As cured | 700 | 21 | 26 |
| | After thermal aging | 740 | 22 | 27 |
| | After accelerated weathering | 730 | 21 | 25 |
| XXV | As cured | 640 | 23 | 28 |
| | After thermal aging | 480 | 27 | 32 |
| | After accelerated weathering | 500 | 18 | 23 |

COMPARATIVE EXAMPLE 1 (Composition XXVI)

The same experimental procedure was repeated as in Example 16 except that POA-VII was replaced with the same amount of a polyoxypropylene terminated at both chain ends with dimethoxymethylsilyl groups expressed by the structural formula below.

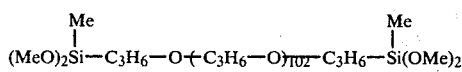

$$(MeO)_2Si\text{—}C_3H_6\text{—}O\!\!+\!\!C_3H_6\text{—}O)_{\overline{102}}C_3H_6\text{—}Si(OMe)_2$$

The mechanical properties of the cured rubbery sheet were: elongation 280%; tensile strength 14 kg/cm²; and hardness 16.

COMPARATIVE EXAMPLE 2 (Composition XXVII)

The same experimental procedure was repeated as in Example 17 using 100 parts of the dimethoxymethylsi-lyl-terminated polyoxypropylene used in Comparative Example 1 above in place of the POA.

The mechanical properties of the cured rubbery sheet obtained therewith were: elongation 370%; tensile strength 9 kg/cm²; and hardness 11.

The storage test was undertaken with the above prepared composition which was packaged in a tube of aluminum foil and kept at 50° C. to become unextrudable after 3 days.

EXAMPLE 19

A reaction mixture was formed by introducing into a flask 300 g of a polyoxyethylenepolyoxypropylene polyether having a viscosity of about 1200 centistokes at 25° C. corresponding to an average molecular weight of about 3500, in which the molar ratio of the oxyethylene groups —CH₂CH₂—O— to oxypropylene groups

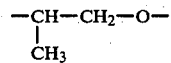

$$-\text{CH}-\text{CH}_2-\text{O}-$$
$$\quad\ |$$
$$\quad\ \text{CH}_3$$

was 20:80 and the terminal groups at the chain ends were 4-pentenyl groups CH₂=CHCH₂CH₂CH—, 32.2 g of methylphenylchlorosilane, 0.3 g of the same solution of chloroplatinic acid as used in Example 1 and 300 g of toluene and the reaction mixture was heated at 130° C. for 5 hours with agitation to give a yellowish brown, viscous fluid. The nonvolatile component in this fluid had an average molecular weight of about 3700 as determined by the method of vapor pressure depression of benzene, which value was in close proximity of the expected value of 3750.

The disappearance of the unsaturated groups and the content of chlorine in the above obtained product supported that the product had terminal groups expressed by the formula

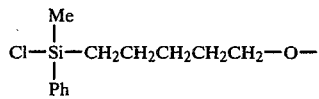

$$\begin{array}{c} \text{Me} \\ | \\ \text{Cl}-\text{Si}-\text{CH}_2\text{CH}_2\text{CH}_2\text{CH}_2\text{CH}_2-\text{O}- \\ | \\ \text{Ph} \end{array}$$

at both molecular chain ends.

After removal of the unreacted methylphenyl-chlorosilane under a reduced pressure and admixture of 25 g of triethylamine, the reaction mixture was kept at 30° C. and 5.0 g of water was added dropwise thereinto over a period of 15 minutes with agitation followed by further agitation at 40° C. for 2 hours to effect hydrolysis of the silicon-bonded chlorine atoms into hydroxy groups.

Removal of the precipitated hydrochloride of triethylamine by filtration and toluene by distillation under a reduced pressure gave 310 g of a yellowish brown liquid product having a viscosity of 1550 centistokes at 25° C. The results of the elementary analysis for silicon 1.4% (calculated value 1.5%), determination of methyl groups bonded to silicon atoms by NMR analysis 0.051 mole/100 g (calculated value 0.053 mole/100 g) and determination of silanol groups 0.050 mole/100 g (calculated value 0.053 mole/100 g) supported that the thus obtained product, which is referred to as POA-IX hereinafter, was expressed by the structural formula given below. The above given yield of the product corresponded to 96% of the theoretical value.

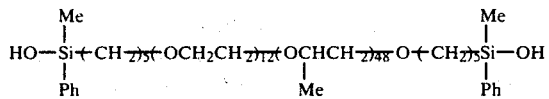

EXAMPLE 20

The same procedure as in Example 1 was repeated except that 26 g of trimethylsiloxy methylchlorosilane was replaced with 37.4 g of 1,1,3,3,5,5-hexamethyl-5-chlorotrisiloxane to give a yellowish brown liquid product having a viscosity of 905 centistokes at 25° C. This product is referred to as POA-X hereinafter.

EXAMPLE 21 (Compositions XXVII and XXVIII)

Two curable compositions were prepared in the same manner and with the same formulation as in Example 12 except that POA-IX and POA-X were used in place of POA-I to POA-V. The mechanical properties of the cured sheets obtained with these compositions as prepared and after storage test in tubes of aluminum foil under the same conditions as in Example 12 were as set out in Table 7 below.

TABLE 7

| Composition No. | POA | As prepared | | | After storage test | | |
|---|---|---|---|---|---|---|---|
| | | Elongation, % | Tensile strength, Kg/cm² | Hardness | Elongation, % | Tensile strength, Kg/cm² | Hardness |
| XXVII | IX | 290 | 12.0 | 28 | 300 | 11.2 | 26 |
| XXVIII | X | 310 | 14.7 | 26 | 300 | 14.0 | 25 |

What is claimed is:

1. A room temperature-curable polyoxyalkylene polyether composition which comprises
   (a) 100 parts by weight of a polyoxyalkylene polyether terminated at both chain ends with silyl groups and represented by the general formula

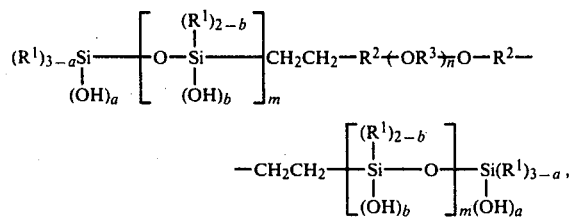

where $R^1$ is a substituted or unsubstituted monovalent hydrocarbon group or a triorganosiloxy group, $R^2$ is a divalent hydrocarbon group, a is zero, 1, 2 or 3, b is zero, 1 or 2 with the proviso that a+b is a positive integer not exceeding 3, m is zero, 1 or 2 and n is a positive integer, having an average molecular weight in the range from 400 to 15,000, or a partial condensation product thereof, and
   (b) from 1 to 30 parts by weight of an organosilane or an organopolysiloxane represented by the formula.

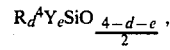

where $R^4$ is a monovalent hydrocarbon group, Y is a hydrolyzable group, d is zero or a positive number not exceeding 2 and e is a positive number not exceeding 4 with the proviso that d+e is a positive number not exceeding 4, and having at least two hydrolyzable group represented by Y in a molecule.

2. The room temperature-curable polyoxyalkylene polyether composition as claimed in claim 1 which further comprises a curing accelerator in an amount not exceeding 10 parts by weight per 100 parts by weight of the component (a).

3. The room temperature-curable polyoxyalkylene polyether composition as claimed in claim 1 which further comprises an α,ω-dihydroxy-diorganopolysiloxane represented by the general formula

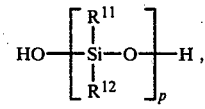

where $R^{11}$ and $R^{12}$ are each a monovalent hydrocarbon group and p is a positive integer, in an amount not exceeding 10 parts by weight per 100 parts by weight of the component (a).

4. The room temperature-curable polyoxyalkylene polyether composition as claimed in claim 1 wherein the organosilane or organopolysiloxane as the component (b) is an alkenyloxycontaining silane represented by the general formula

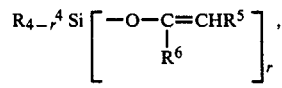

where $R^4$ has the same meaning as defined above, $R^5$ and $R^6$ are each a hydrogen atom or a monovalent hydrocarbon group but not simultaneously hydrogen atoms, and r is 2, 3 or 4 or a partial hydrolysis condensation product thereof.

5. The room temperature-curable polyoxyalkylene polyether composition as claimed in claim 4 which further comprises an organosilane or an organopolysiloxane having, in a molecule, at least one guanidyl group represented by the general formula

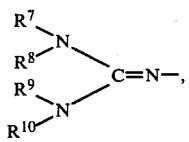

where $R^7$, $R^8$, $R^9$ and $R^{10}$ are each a monovalent hydrocarbon group, in an amount from 0.01 to 15 parts by weight per 100 parts by weight of the component (a).

6. The room temperature-curable polyoxyalkylene polyether composition as claimed in claim 5 which further comprises a curing accelerator in an amount not exceeding 10 parts by weight per 100 parts by weight of the component (a).

7. The room temperature-curable polyoxyalkylene polyether composition as claimed in claim 5 which further comprises an $\alpha,\omega$-dihydroxydiorganopolysiloxane represented by the general formula

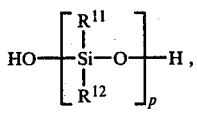

where $R^{11}$ and $R^{12}$ are each a monovalent hydrocarbon group and p is a positive integer, in an amount not exceeding 100 parts by weight per 100 parts by weight of the component (a).

8. The room temperature-curable polyoxyalkylene polyether composition as claimed in claim 1 wherein the triorganosiloxy group represented by $R^1$ is a group represented by the general formula $R_3SiO—$, where R is a substituted or unsubstituted monovalent hydrocarbon group having from 1 to 18 carbon atoms.

9. The room temperature-curable polyoxyalkylene polyether composition as claimed in claim 1 wherein $R^3$ is a divalent hydrocarbon group having from 1 to 4 carbon atoms.

10. The room temperature-curable polyoxyalkylene polyether composition as claimed in claim 1 wherein $R^3$ is a propylene group.

11. The room temperature-curable polyoxyalkylene polyether composition as claimed in claim 1 wherein Y is a hydrolyzable group selected from the class consisting of alkoxy groups, acyloxy groups, ketoxime groups, amide groups, substituted or unsubstituted amino groups and substituted or unsubstituted aminoxy groups.

12. The room temperature-curable polyoxyalkylene polyether composition as claimed in claim 3 or claim 4 wherein the number p has a value such that the $\alpha,\omega$-dihydroxydiorganopolysiloxane has a viscosity in the range from 100 to 500,000 centistokes at 25° C.

13. The room temperature-curable polyoxyalkylene polyether composition as claimed in claim 4 wherein $R^5$ is a hydrogen atom and $R^6$ is a methyl group.

14. The room temperature-curable polyoxyalkylene polyether composition as claimed in claim 4 wherein the amount of the alkenyloxy-containing silane or a partial hydrolysis condensation product thereof is in the range from 4 to 20 parts by weight per 100 parts by weight of the component (a).

15. The room temperature-curable polyoxyalkylene polyether composition as claimed in claim 5 wherein the organosilane having, in a molecule, at least one guanidyl group is 3-(tetramethylguanidyl)propyl trimethoxysilane.

* * * * *